Aug. 17, 1954 — J. E. NICKELS — 2,686,815
SEPARATION OF THIOPHENOLS FROM PHENOLS
BY SELECTIVE ALKYLATION
Filed May 11, 1951 — 4 Sheets-Sheet 1

INVENTOR
JOSEPH E. NICKELS
BY
ATTORNEY

INVENTOR
JOSEPH E. NICKELS
BY
ATTORNEY

INVENTOR
JOSEPH E. NICKELS
BY
ATTORNEY

Patented Aug. 17, 1954

2,686,815

UNITED STATES PATENT OFFICE 2,686,815

SEPARATION OF THIOPHENOLS FROM PHENOLS BY SELECTIVE ALKYLATION

Joseph E. Nickels, Pittsburgh, Pa., assignor to Koppers Company, Inc., a corporation of Delaware Application May 11, 1951, Serial No. 225,851

6 Claims. (Cl. 260—609)

This invention relates to the separation or isolation of one or more components of a mixture consisting essentially of a thiophenol and at least one closely boiling phenol and is particularly adapted to the refining of "cresylic acids" of the type that are obtained from petroleum oil and contain sulfur compounds in the form of thiophenols.

I have discovered that a thiophenolic compound and a phenolic compound behave differently when a mixture of these compounds reacts with an alkylating agent that furnishes a tertiary alkyl group. When such a mixture is alkylated with the specified type of alkylating agent under conditions which provide an excess of alkylating agent over that equal to the sum of one stoichiometric equivalent of the thiophenolic compound and two stoichiometric equivalents of the phenolic compound, the thiophenolic compound characteristically reacts to add only a single alkyl group and hence forms substantially only the mono-tertiary alkyl derivative while the phenolic compound characteristically reacts to add more than one alkyl group and hence forms substantially only poly-tertiary alkyl derivatives, such as a di- or tri-tertiary alkyl derivative, all in accordance with my invention. The derivatives of the thiophenolic compound and the phenolic compound show a considerable difference in their physical properties, particularly their boiling points, due to the minimum difference of one alkyl group and therefore are easily separated, as by distillation. After separation, either or both of such derivatives can be dealkylated to produce the parent compound in purified form. Since I have found that my invention can be advantageously applied to the separation and/or purification of the compounds found in petroleum cresylic acids, I have explained a typical embodiment of my invention below in reference to its application to petroleum cresylic acid.

Petroleum cresylic acid is a mixture of a large number of compounds among which are phenol, thiophenol, ortho-, meta- and para-cresols, and meta- and para-tolyl mercaptans (thiocresols) and xylyl-mercaptans (thioxylenols). Because of its high sulfur content, which may be as much as 4 to 7 percent by weight of sulfur, such cresylic acid is commercially undesirable and means have been sought to remove the sulfur-containing compounds. However, many of the phenols and thiophenols have closely related boiling points and freezing points so that it is difficult to separate such compounds by simple methods, such as distillation or crystallization.

My invention affords an easy and economical method for effecting such a separation. Various features of my invention and a typical example are described in connection with the accompanying drawings in which.

As stated above, petroleum cresylic acid is made up of a crude mixture of many phenols and thiophenols which cannot be fully separated from each other by distillation. According to an aspect of the present invention, this crude mixture is distilled and separated into cuts or fractions which have about 5° to 15° C. boiling point range. The distillation of a typical petroleum cresylic acid in a 23 plate column is illustrated in the following table:

TABLE I

*Distillation and sulfur analyses of a typical petroleum cresylic acid*

| Fraction | Temp., ° C. at 20 mm. Hg | Weight, Grams | Volume, Percent | Sulfur, Percent (Weight) | Components |
|---|---|---|---|---|---|
| A | 50–77 | 106.1 | 4.0 | 25.23 | Thiophenol. |
| B | 77–87 | 430.6 | 16.2 | 14.09 | Phenol+o-thiocresol. |
| C | 87–95 | 496.3 | 19.1 | 3.76 | o-Cresol+m- and p- thiocresols. |
| D | 95–103 | 623.6 | 24.2 | 0.78 | m- and p-Cresols+thioxylenols. |
| E | 103–109 | 233.6 | 9.1 | 0.63 | Transition. |
| F | 109–115 | 281.9 | 11.1 | 0.63 | Xylenols+alkyl thiophenols. |
| G | 115–120 | 240.1 | 9.6 | 2.18 | Do. |
| H | 120–130 | 84.8 | 3.3 | 5.17 | Do. |
| R | over 130 | 85.3 | 3.4 | 9.17 | Residue. |
|  |  | 2,582.3 | 100.0 |  |  |

The crude petroleum cresylic acid analyzed 5.10% by weight of sulfur.

It will be noted that this distillation was carried out at 20 mm. Hg pressure in order to avoid decomposition of any of the components of the cresylic acid. However, higher pressures may be used. Various cuts or fractions of this distillation were thereafter refined separately in order to separate the components of the cut.

Figure 1:
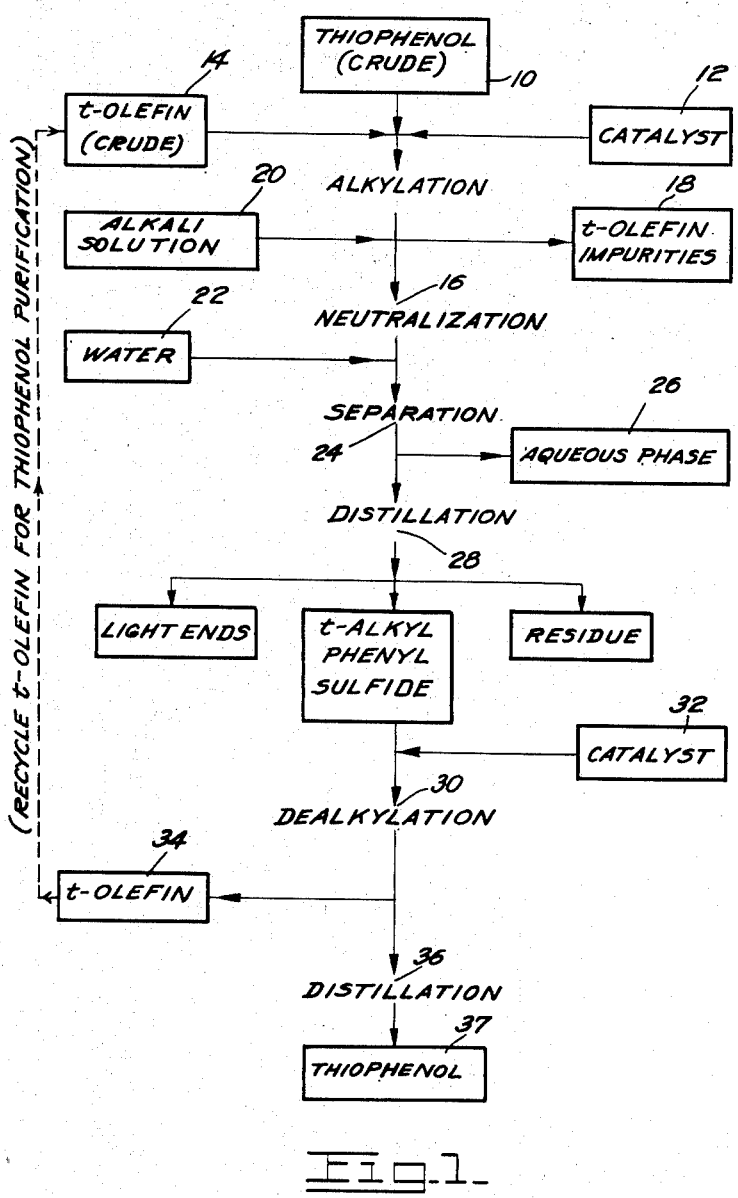
Figure 1 is a diagrammatic flow sheet of the steps involved in the refining of a low boiling point cut separated from petroleum cresylic acid by distillation.

In Figure 1 is illustrated the process steps involved in the refining of a thiophenol cut to recover a pure thiophenol. Crude thiophenol from container 10 is alkylated using a catalyst, such as approximately 5 percent of 66° Bé. sulfuric acid, from container 12 and isobutylene from container 14. The alkylation step is carried out with an excess of isobutylene at a temperature of approximately 65° C. The amount of sulfuric acid used may vary from about 0.5 to 5.0 percent by weight of the crude thiophenol and the temperature may vary from about 0° to 125° C., a particularly advantageous range being from about 50° to 100° C. High temperatures are preferred when the amount of sulfuric acid used is small. In the alkylation reaction, a mono-tertiary derivative of thiophenol is formed with the simultaneous formation of a tri-tertiary alkyl derivative of the phenol that is present due to the difficulty of completely separating thiophenol and phenol by distillation alone. The alkylation products or reaction mixture is then passed into a neutralizer 16 after removing the tertiary olefin impurities which pass into a receiver 18. For neutralization, alcohol potassium or sodium hydroxide is preferred, the alcohol being ethyl alcohol. Aqueous solutions of alkalies, or an anion exchange resin may be used for the neutralization. Alcoholic alkali is taken from holder 20 and passed into the alkylation products flowing into the neutralizer 16. The neutralized product is washed with water from a container 22. The product is decanted in a separator 24, the aqueous phase being drawn off into a receiver 26.

The neutralized alkylated product (non-aqueous phase) is then run into a vacuum still 28 where it is preferably distilled under a vacuum such as at 15 to 100 mm. Hg, absolute pressure. A tertiary-alkyl derivative of the thiophenol, which in this case is butylated phenyl mercaptan, is then passed into a dealkylation chamber or zone 20 and mixed with a catalyst from container 32. A useful dealkylation catalyst is 3 percent by weight of concentrated sulfuric acid based on the alkyl derivatives being treated. The dealkylation step is carried out at a temperature of about 150° to 300° C. depending upon the amount of sulfuric acid present, where the amount of acid can vary from about 3 percent to 0.2 percent. In the dealkylation step, substantially pure isobutylene is removed from the converter and passed to a receiver 34 from which the olefin may be returned to the receiver 14 for reuse. The dealkylated thiophenol then flows to a distillation unit 36 where it is preferably distilled under a subatmospheric pressure in order to recover a substantially pure thiophenol which passes to a receiver 37. The thiophenol is recovered in substantially pure form by the above-mentioned process. In the above process, the alkylation of the thiophenol can be carried out by a mixture of olefins which contains primary, secondary and tertiary olefins. The thiophenol reacts only with the tertiary olefins to form alkylated thiophenol and, when the alkylated thiophenol is dealkylated, a pure tertiary olefin can be recovered.

Typical results of using the method described in connection with Figure 1 are illustrated in the following table summarizing the distillation and analyses of distillates of the non-aqueous phase of the neutralized alkylation products from 102.7 gm. of a thiophenol cut (cut A, Table I):

TABLE II

*Distillation of alkylation products of thiophenol cut in a 27 plate column*

| Fraction | Temp. in °C. of Distn. at 20 mm. | Weight of Fraction, Grams | Volume, Percent | Sulfur Content in Wt., Percent | Identification |
|---|---|---|---|---|---|
| A-1 | 65–101 | 4.4 | 3.5 | | Forerunnings. |
| A-2 | 101–102 | 85.3 | 63.4 | 19.50 | t-Bu-thiophenol. |
| A-3 | 102–115 | 7.5 | 5.6 | 17.33 | Intermediate. |
| A-4 | 115–145 | 11.2 | 8.5 | 12.28 | Do. |
| A-5 | 145–170 | 18.2 | 15.5 | 0.67 | (t-Bu)₃phenol. |
| A-6 | Residue | 5.0 | 3.5 | | |

These data indicate that over 60 percent of the original material was converted into tertiary butyl thiophenol whose sulfur analysis indicated that it was substantially uncontaminated with other compounds (the sulfur analysis of the original cut indicated that the thiophenol content was less than 88 percent). Concomitantly 15.5 percent of the tributylated derivative of phenol having a sulfur content of less than 1 percent was recovered. This is in sharp contrast with the phenol cut from the initial distillation of the crude which cut contained over 14 percent of sulfur. The two intermediate fractions can variously be recycled or redistilled to yield additional quantities of the thiopenol and phenol derivatives. The butylated thiophenol cut (A-2) and the butylated phenol cut (A-5) can be easily debutylated separately to yield the parent compounds as described above.

Figure 2:
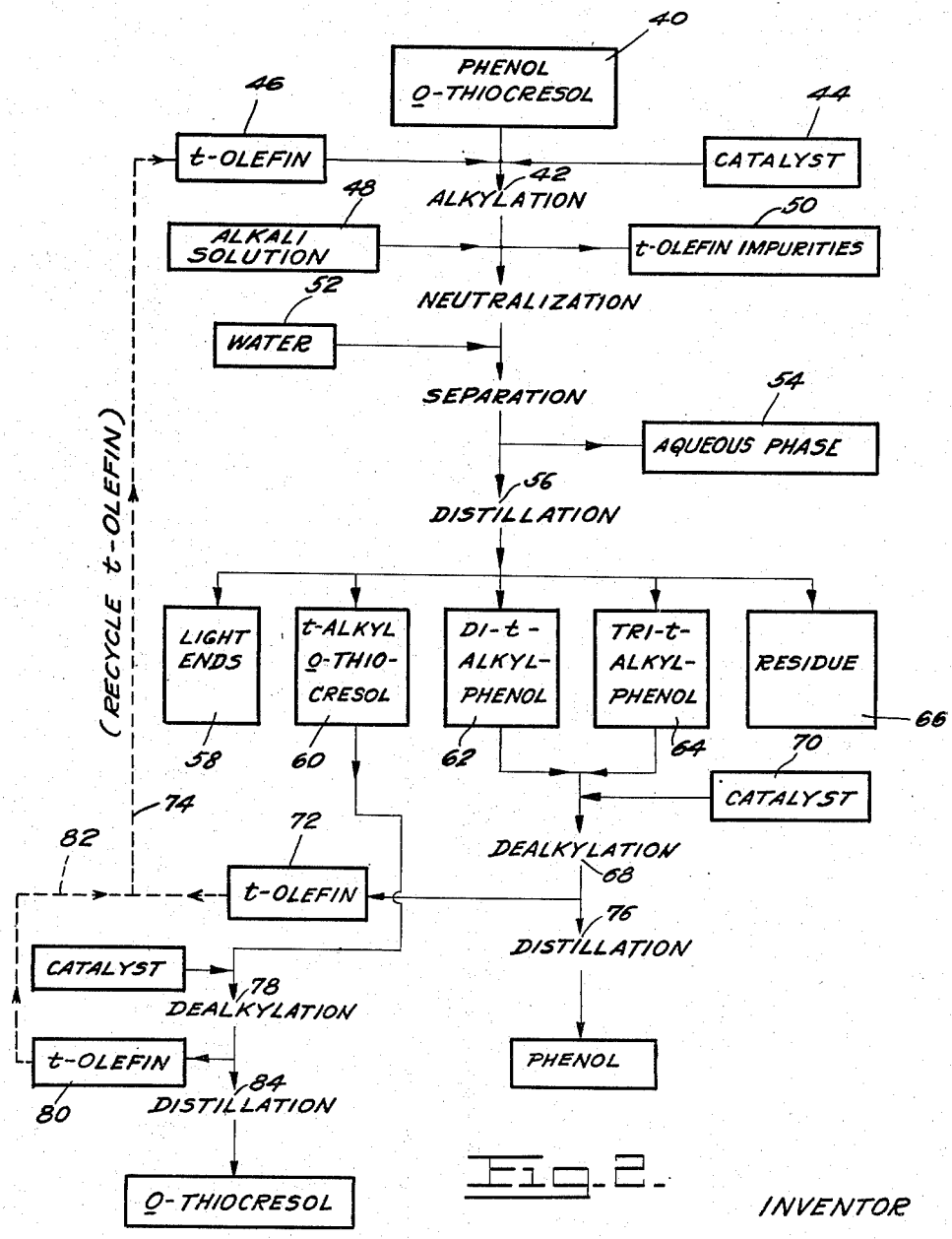
Figure 2 is a diagrammatic flow sheet of the steps involved in refining a mixture of phenol and ortho-thiocresol, or tolyl mercaptan, separated from crude petroleum cresylic acid by distillation.

In Figure 2 is illustrated the refining of a fraction or cut which contains phenol and ortho-thiocresol, cut B, Table I. This crude mixture is held in a container 40 and passes into an alkylation converter or zone 42. In the converter 42, sulfuric acid from a container 44 is added at the same time that isobutylene is added from a container 46. The alkylate or reaction mixture is then neutralized, as described above, with caustic solution drawn from a container 48 and separated from impurities in the olefin, the impurities passing to receiver 50. The neutralized alkylate is then washed with water introduced from a container 52 and the water washed material is separated by decantation and passed to a receiver 54. This washed alkylate is then passed into a still 56 and distilled to be separated into five parts. The light ends pass into a receiver 58; a mixture of mono-tertiary-alkyl-ortho-thiocresol passes into a receiver 60; a di-tertiary-alkylphenol passes into receiver 62; a tri-tertiary-alkylphenol product passes into a receiver 64 and a residue is collected in a receiver 66. The di-tertiary-alkylphenol and the tri-tertiary-alkylphenol cuts are then passed into a dealkylation converter 68 where they are mixed with concentrated sulfuric acid from a holder 70. In the dealkylation, isobutylene is driven off and this isobutylene passes to a receiver 72. The isobutylene may in turn pass through a line 74 to the receiver 46 for reuse. By the dealkylation process phenol is produced which then flows to a still 76 to be distilled in order to recover a pure product.

The mono-tertiary-alkyl-ortho-thiocresol from receiver 60 flows to a dealkylating converter 78 where it is mixed with concentrated sulfuric acid and dealkylated. In the dealkylation process isobutylene is driven off and passes to a receiver 80 which in turn may pass through a line 82 and line 74 to the receiver 46. The dealkylated thiocresol then flows into a still 84 where it is distilled to yield substantially pure ortho-thiocresol.

In the refining of the cut or fraction as illustrated in Figure 2 the alkylation and dealkylation steps can be carried out with concentrated sulfuric acid using substantially the same temperatures and amounts of acid as that described as being used in the alkylation and dealkylation steps of the process of Figure 1.

Typical results of using the method described in connection with Figure 1 are illustrated in the following table summarizing the distillation and analyses of distillates of the non-aqueous phase of the neutralized alkylation products from 150 grams of a phenol cut (cut B, Table I).

TABLE III

*Distillation of alkylation products of phenol cut in a 27 plate column*

| Fraction | Temp. in °C. of Distn. at 20 mm. | Weight of Fraction, Grams | Volume, Percent | Sulfur Content in Wt., Percent | Identification |
| --- | --- | --- | --- | --- | --- |
| B-1 | 73-106 | 4.2 | 2.0 | 9.54 | Forerunnings. |
| B-2 | 106-110 | 5.7 | 2.4 | 11.27 | Unidentified. |
| B-3 | 110-115 | 6.7 | 2.8 | 17.28 | Intermediate. |
| B-4 | 115-117 | 75.4 | 32.0 | 15.77 | t-Bu-o-thiocresol. |
| B-5 | 117-135 | 11.3 | 4.8 | 8.84 | Intermediate. |
| B-6 | 135-137 | 23.1 | 10.0 | 0.33 | (t-Bu)₂phenol. |
| B-7 | 137-153 | 16.4 | 7.2 | 0.36 | Intermediate. |
| B-8 | 153-160 | 80.0 | 34.0 | 0.10 | (t-Bu)₃phenol. |
| B-9 | Residue | 11.5 | 4.8 | | |

These data indicate that over 50 percent of the original cut was recovered as poly-butylated phenols (cuts B-6, 7 and 8). Since the content of phenol in the original cut was about 55 percent (based on the sulfur content and on o-thiocresol present), this is a recovery of about 94 percent. It is to be further noted that, based on the sulfur content of cuts B-6, 7 and 8, the maximum contamination of the poly-butylated phenols by poly-butylated o-thiocresol is less than 2 percent.

The sulfur content of the tertiary-butyl o-thiocresol indicated that it was almost 90 percent pure. If the non-sulfur-containing impurity in the tertiary-butyl o-thiocresol is assumed to be mono-butyl phenol, it corresponds to, at most, less than 5 percent of the phenol content that was not poly-butylated.

Figure 3:
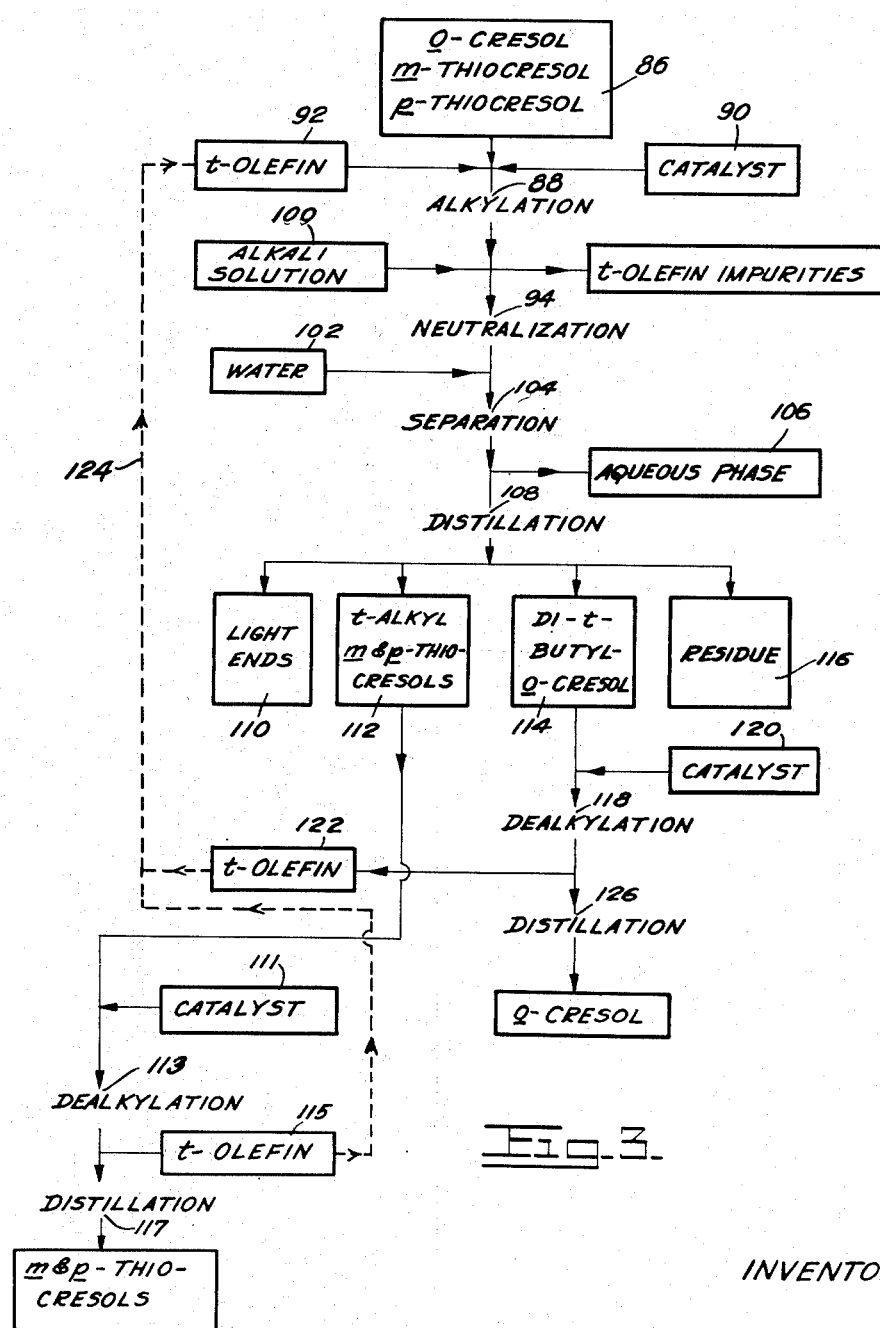
Figure 3 is a diagrammatic flow sheet of the steps involved in the refining of a mixture of ortho-cresol and meta- and para-thiocresols obtained by distillation of crude petroleum cresylic acid.

In Figure 3 is illustrated the process steps used for distilling a cut, cut C, Table I, obtained by the primary distillation of a crude cresylic acid which contains ortho-cresol, meta-thiocresol and para-thiocresol. This mixture is held in a container 86 and passes into an alkylating converter 88 where it is mixed with sulfuric acid from container 90 and butylene from a container 92. The alkylated products are then passed to a neutralizer 94 where they are treated with a caustic solution from container 100, the neutralization separating tertiary olefin impurities. The neutralized product is then washed with water from a container 102 and passed into a separator 104 where the water washing material is removed into a receiver 106. The washed alkylate is then passed to a still 108 where it is distilled under subatmospheric pressure. In the distillation, light ends are collected in a receiver 110. A mixture of tertiary-butyl-meta- and para-thiocresols is collected in a receiver 112, a di-tertiary-butyl-ortho-cresol cut is collected in a receiver 114, and a residue passes to a receiver 116. The di-tertiary-butyl-ortho-cresol is then passed to a dealkylating converter 118 where it is mixed with sulfuric acid catalyst from container 120. By dealkylation, ortho-cresol is formed while substantially pure isobutylene passes out of the converter into a receiver 122 and may be conducted back through a line 124 to a receiver 92. The ortho-cresol then passes to a still 126 where it is distilled to obtain a substantially pure product.

The mixture of tertiary-butyl meta- and para-thiocresols may be mixed with a dealkylation catalyst, such as sulfuric acid, from a container 111 and dealkylated in a dealkylation chamber or zone 113. The parent thiocresols are formed while substantially pure isobutylene passes out of the converter into a receiver 115 and thence, if desired, to line 124 for reuse. The mixture of m- and p-thiocresols then passes to a still 117 where either a purified mixture of m- and p-thiocresol is produced or separate fractions concentrated in m-thiocresol and p-thioscesol are separated.

Alternatively, the mixture of tertiary-butyl meta- and para-thiocresols may be first distilled and then separately dealkylated. After dealkylation, each of the products may be separately distilled, if desirable, to recover substantially pure meta-thiocresol and para-thiocresol.

In the refining of the cut or fraction as illustrated in Figure 3 the alkylation and dealkylation steps can be carried out with concentrated sulfuric acid using substantially the same temperatures and amounts of acid as that described as being used in the alkylation and dealkylation steps of the process of Figure 1.

Figure 4:
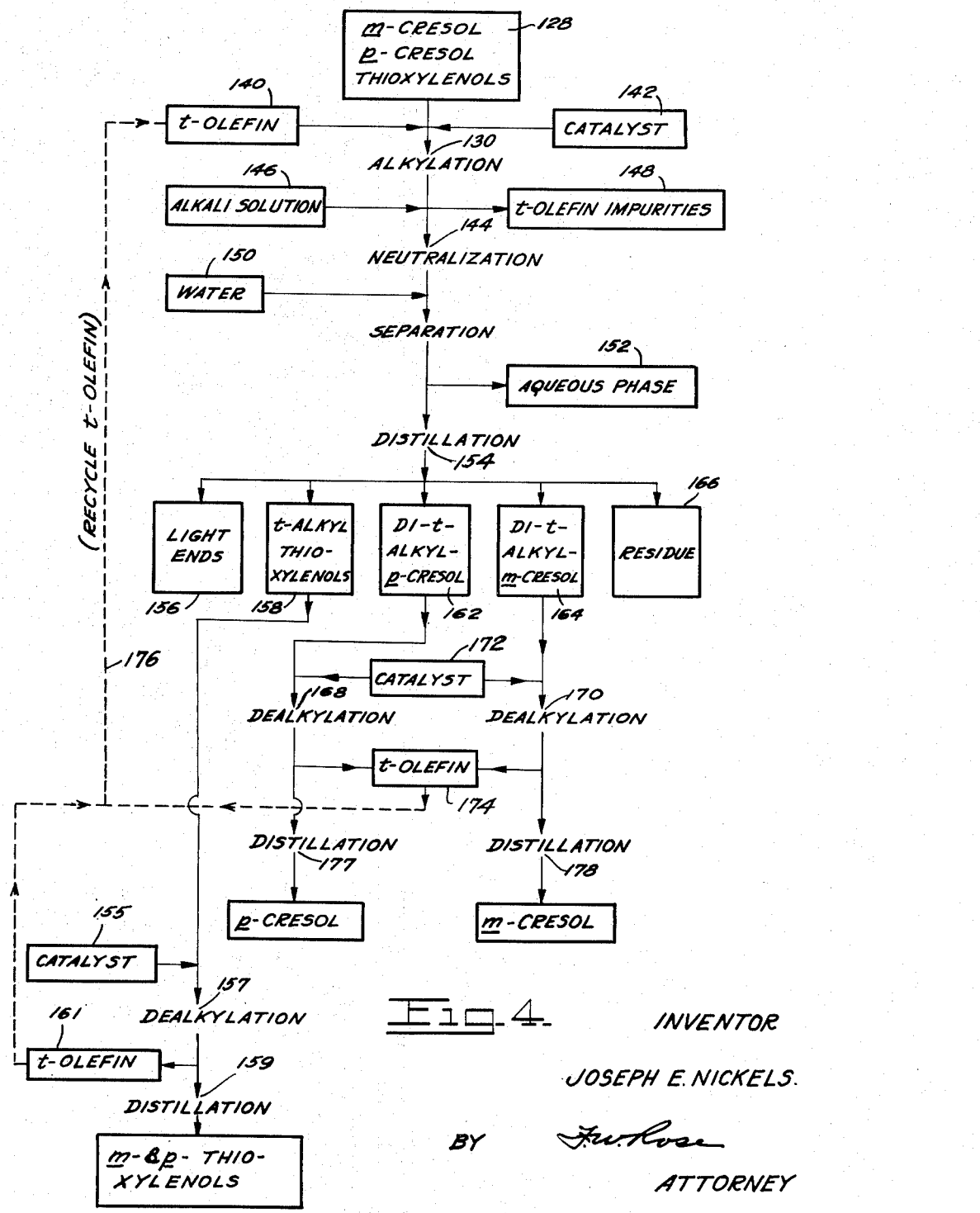
Figure 4 is a diagrammatic flow sheet showing the steps involved in the refining of a mixture of meta- and para-cresol and xylyl mercaptans obtained by distillation of crude petroleum cresylic acid.

In Figure 4 is illustrated the steps of a process by which a mixture of meta-cresol, para-cresol and thioxylenols, cut D of Table I, may be refined to separate the components and obtain substantially pure products. This mixture has a closely related boiling range and is recovered from the crude cresylic acid distillation as a single cut. The mixture of meta- and para-cresols with thioxylenols is held in a container 128. This mixture passes to an alkylation converter 130 where it is treated with isobutylene from a receiver 140 and sulfuric acid from a container 142. The alkylated mixture then passes into a neutralizer 144 where it is treated with an alcoholic caustic solution from a container 146 to separate tertiary olefin impurities. The impurities pass off to a receiver 148. The neutralized alkylate is then washed with water from a container 150, the water washing material passing into a receiver 152. The washed alkylate then passes into a still 154 where it is distilled under subatmospheric pressure. In the distillation a light end is collected in a receiver 156, a tertiary-butyl-thioxylenol cut is collected in a receiver 158, a di-tertiary-butyl-para-cresol cut is collected in a receiver 162, a di-tertiary-butyl-meta-cresol cut is collected in a receiver 164, and a residue in receiver 166. The di-tertiary-butyl-para- and meta-cresol cuts are thereafter passed into separate dealkylation converters 168 and 170 respectively where they are treated with a sulfuric acid catalyst from a container 172. In the dealkylation, isobutylene is recovered which passes to a receiver 174 and may flow through a line 176 back to the reeciver 140. Each of these dealkylated products then passes into fractionating stills 177 and 178 where they are distilled to recover respectively substantially pure para-cresol and meta-cresol.

The mixture of t-butyl thioxylenols can be treated in a similar manner to that described in connection with the separation of m- and p-thiocresols in Figure 3. Thus, dealkylation catalyst is added from container 155, dealkylation effected in a dealkylation chamber or zone 157, the regenerated butylene separated and passed to a receiver 161 and, optionally, to line 176 for recycling. The regenerated thioxylenols may be passed to a still 159 and further purified.

The method of treatment described in connection with Figure 4 may be applied to the purification of m- and p-cresols that contain thioxylenols in small enough amounts that they can be considered impurities rather than substantial components of a mixture, such as fraction D in Table I. In a typical example of such purification, about 200 grams of fraction D was alkylated, using 0.5 percent of concentrated sulfuric acid as a catalyst, by bubbling isobutylene into the fraction at 65° C. until the reaction mixture attained constant weight. The alkylation mixture was first treated with alcoholic alkali, water washed and distilled in a 23 plate column at 20 mm. Hg. Of the 338 grams of alkylate distilled, 18.4 grams or 6.3 percent that distilled at 69 to 80° C. was identified as mainly triisobutylene that was present due to a minor amount of polymerization of the isobutylene. About 25 volume percent of the distillate was relatively pure 2,6-di-tertiary butyl-p-cresol boiling within 2° C. (146–148° C.) and about 29 volume percent was relatively pure 4,6-di-tertiary butyl - m - cresol boiling substantially constantly at 164° C. However, as collected, these distillates included some intermediate material and were about 38 and 29 volume percent of the total distillate. These distillates were analyzed for sulfur and contained 0.09 and 0.16 weight percent of sulfur respectively. It is thus obvious that the mono-butyl thioxylenols formed in the alkylation were separated in the distillation and the alkylation mixture yielded butylated cresols of very low sulfur content and hence commercially acceptable. It is to be further noted that this method not only drastically reduced the sulfur content of the cresols but also simultaneously effected separation of the m- and p-butyl derivatives, which can be dealkylated separately, by known methods, to yield purified m-cresol and p-cresol. It is also obvious that the fraction intermediate the forerunnings and the 2,6-di-tertiary butyl-p-cresol (and boiling from 80° to 138° C. at 20 mm. Hg) can be redistilled to recover the mono-butylated thioxylenols concentrated in this boiling range, the alkylated thioxylenols can be subsequently dealkylated to yield the parent thioxylenols in concentrated form.

The xylenols and sulfur compounds contained in fractions F, G and H may be refined or purified by similar methods to those described above.

In all of the dealkylation processes pure isobutylene will be recovered. Tests have shown, however, that the olefin used in the alkylation and recovered in the dealkylation steps need not be isobutylene but may be any low molecular weight tertiary olefine, particularly olefins having four to six carbon atoms to the molecules. Furthermore, the tertiary olefin used in alkylating need not be pure because the alkylation process is selective in reacting only with the tertiary olefin. Indeed any low molecular weight alkylating agent, such as saturated aliphatic alcohols or halides, which furnishes a tertiary alkyl group can be employed. The criterion of selection of an alkylating agent is merely that it furnish a tertiary alkyl group under the conditions, such as temperature and catalyst, employed.

In the processes described above, the alkylation step may be advantageously carried out using about 0.5 to 5.0 percent by weight of concentrated sulfuric acid based upon the amount of crude cresylic acid product being alkylated. In general, it is preferred to operate at temperatures above about 0° C. since too much physical solution of the tertiary olefin is apt to occur below this temperature and to operate below about 125° C. since polymerization of the olefin and dealkylation are apt to occur above this temperature. In place of sulfuric acid, other polybasic mineral acids, such as phosphoric acid, Friedel-Crafts catalysts, aryl and alkyl sulfonic acids, such as benzene-sulfonic acid, phenolsulfonic acid, phenol-disulfonic acid, ethane-sulfonic and propanesulfonic acid, alkyl sulfates and other alkylation catalysts known to the art may be used as alkylation catalysts. These same alkylation catalysts can likewise be used for dealkylation catalysts. For the dealkylation step, less acid is generally required, that is from amount equivalent to about 0.2 to 3 percent by weight of concentrated sulfuric acid based on the alkylated product, and the temperature may vary from about 150° to 350° C. in accordance with the activity of the catalyst used.

In the above-described process, the dealkylated products have been described as being purified by vacuum distillation. The products may, in some cases, be purified by atmospheric pressure distillation. It has also been found that these products in a more pure form may be recovered and separated by crystallization, particularly when used in conjunction with distillation. Therefore, in the claims the further purification of the acid constituents by distillation and/or crystallization is referred to as "physical separation."

In summary of the above description and data, I have discovered that thiophenolic compounds, particularly monohydric thiophenols, such as thiocresols and thioxylenols, characteristically behave differently than do phenolic compounds, such as the monohydric phenolic compounds, phenol and cresol, when alkylated with a tertiary alkyl group. Such thiophenolic compounds have the common inherent property of forming predominantly, and even substantially solely, the mono-tertiary alkyl derivative (i. e., poly-tertiary-alkyl derivatives are formed in minor amounts if at all) over a wide range of alkylation conditions, the nature of which is generally known to the art, under which phenolic compounds simultaneously form poly-tertiary alkyl derivatives (i. e., any mono-tertiary alkyl phenolic derivatives formed are predominantly or completely further alkylated to poly-tertiary alkyl compounds). As is obvious, sufficient alkylating agent must be present to achieve this result. As a consequence of this inherent property of the thiophenolic compounds, the alkylated thiophenols contain at least one alkyl group less than do the alkylated phenolic compounds and hence are easily physically separated, as by distillation, from the alkylated phenolic compounds even though the parent compounds were so closely alike in physical properties, such as boiling point, as to be difficulty separable if at all.

It is my opinion, not to be construed as limiting my invention, that this difference in the fundamental chemistry of these two classes of compounds is based on the formation of a stable sulfide linkage with the alkyl group whereas the oxygen linkage with the alkyl group is, under the same conditions, unstable or labile and rearranges to yield a compound in which the alkyl group is bound to the nucleus or benzene ring portion of the phenol, thus freeing the phenolic group for further alkylation. I base my opinion on the experimental fact that spectroscopic examination of the alkylated thiophenols indicates that they are thio-ethers whereas the alkylated phenols have the physical properties of known nuclear substituted compounds. However, whatever the explanation, I have proved, as set forth above, the utility of my invention as a means of separating and/or purifying at least one of the components of a dufficultly separable mixture of a thiophenolic compound and a phenolic compound. At the same time the other component or components of the mixture are purified and may be sold or used as either the alkyl derivative or, after dealkylation, as the parent compound.

This application is a continuation-in-part of my copending application, Serial No. 70,179, filed January 11, 1949, now abandoned.

I claim as my invention:

1. A method for isolating at least one component of a mixture comprising a thiophenol and at least one closely boiling phenol which comprises reacting said mixture in the presence of an acidic alkylation catalyst with a low molecular weight alkylating agent which furnishes a tertiary alkyl group, said alkylating agent being present in amonut sufficient to form a mono-tertiary alkyl derivative of said thiophenol together with at least one poly-tertiary alkyl substituted phenol in which said substitution does not exceed three, physically separating said mono-tertiary alkyl derivative and sail poly-tertiary alkyl product and dealkylating at least one of said derivatives to yield the parent compound as a purification product.

2. A method for isolating at least one component of a mixture comprising a thiophenol and at least one closely boiling phenol which comprises reacting said mixture in the presence of an acidic alkylation catalyst with a low molecular weight tertiary alkene, said alkene being present in amount sufficient to form a mono-tertiary alkyl derivative of said thiophenol together with at least one poly-tertiary alkyl substituted phenol in which said substitution does not exceed three, physically separating said mono-tertiary alkyl derivative and said poly-tertiary alkyl product, and dealkylating at least one of said derivatives to yield the parent compound as a purified product.

3. A method for separating o-thiocresol from phenol in a mixture thereof which comprises reacting said mixture in the presence of an acidic alkylation catalyst with tertiary alkene having no more than six carbon atoms, said alkene being present in amount sufficient to form a mono-tertiary alkyl derivative of o-thiocresol together with poly-tertiary alkyl substituted phenol in which said substitution does not exceed three, physically separating said mono-tertiary alkyl derivative from said poly-tertiary alkyl derivative, and dealkylating at least one of said derivatives.

4. A method of separating m- and p-thiocresols from o-cresol in a mixture thereof which comprises reacting said mixture in the presence of an acidic alkylation catalyst with a tertiary alkene having no more than six carbon atoms said alkene being present in amount sufficient to form mono-tertiary alkyl derivatives of the thiocresols, together with di-tertiary alkyl derivatives of o-cresol, physically separating said mono-tertiary alkyl derivatives from said di-tertiary alkyl derivative, and dealkylating at least one of said derivatives.

5. A method for separating thiovylenols from m- and p-cresols in a mixture thereof which comprises reacting said mixture in the presence of an acidic alkylation catalyst with a tertiary alkene having no more than six carbon atoms, said alkene being present in amount sufficient to form mono-tertiary alkyl derivatives of the thioxylenols together with di-tertiary alkyl derivatives of the cresols, physically separating said mono-tertiary alkyl derivatives from said di-tertiary alkyl derivatives, and dealkylating at least one of said derivatives.

6. A method for treating a phenol containing a thiophenolic impurity which comprises reacting said mixture in the presence of an acidic alkylation catalyst with a low molecular weight alkylating agent which furnishes a tertiary-alkyl group, said alkylating agent being present in amount sufficient to form a mono-tertiary alkyl derivative of said thiophenol together with poly-tertiary alkyl substituted phenol in which said substitution does not exceed three, and physically separating at least one of said poly-tertiary alkyl derivatives of said phenol from the mono-tertiary alkyl derivative of said thiophenol to yield poly-tertiary alkyl derivative of reduced sulphur content.

References Cited in the file of this patent

UNITED STATES PATENTS

| Number | Name | Date |
| --- | --- | --- |
| 2,265,583 | Stevens et al. | Dec. 9, 1941 |
| 2,290,603 | Stevens et al. | July 21, 1942 |
| 2,334,691 | Andersen | Nov. 23, 1943 |
| 2,435,038 | Luten, Jr. et al. | Jan. 27, 1948 |
| 2,488,479 | Schindler | Nov. 15, 1949 |
| 2,589,253 | Hervert et al. | Mar. 18, 1952 |

FOREIGN PATENTS

| Number | Country | Date |
| --- | --- | --- |
| 548,545 | Great Britain | Oct. 14, 1942 |